Nov. 13, 1962  IB HUNDERUP JENSEN ETAL  3,063,285
PRINTING INK RUB-OFF TESTER
Filed Feb. 13, 1961

INVENTORS
Ib Hunderup Jensen
Jørgen Reimann

BY Watson, Cole, Grindle & Watson
ATTORNEYS

United States Patent Office 3,063,285
Patented Nov. 13, 1962

3,063,285
PRINTING INK RUB-OFF TESTER
Ib Hunderup Jensen, Hvidovre, and Jorgen Reimann, Rungsted, Denmark, assignors to Den Danske Presses Faellesindkøbs-Forening, Copenhagen, Denmark
Filed Feb. 13, 1961, Ser. No. 88,762
6 Claims. (Cl. 73—7)

This invention relates to a device for use in testing the rub-off proofness of printing ink.

In making tests of this nature, it is customary to subject a printed sheet of paper to a rubbing action and then to examine to which extent the printing ink has been smeared or rubbed off. This examination may be made by subjecting the sheet to photo-electric measurement before and after rubbing, and comparing the results. Accurate and reliable methods and apparatus are readily available for performing such photo-electric measurements. Problems are encountered, however, in obtaining similar accuracy and constancy of the rubbing action, failing which dependability of the photo-electric measurements is in fact of little use.

Various apparatus and devices have been proposed for carrying out the rubbing operation, but none of these have been found entirely satisfactory. First, many of the known apparatus are too expensive to manufacture and too complicated in use, and second they tend to tear the paper being tested and do not give sufficiently uniform results.

It is an object of the invention to devise a simple and reliable apparatus capable of subjecting a printed sheet to a uniform and accurately predictable rubbing action so that, in combination with a photo-electric or other suitable measurement, reproducible measuring results may be obtained, and objective rub-off proofness standards may consequently be established.

It is another object of the invention to devise a simple and ever-ready rub-off tester by means of which the rubbing step of the testing procedure can be made without any preparatory steps and in a minimum of time by simply placing the tester on a sheet lying freely on a supporting surface, and starting it.

With these and related objects in view which will be apparent as the description proceeds, according to a principal feature of the invention, a printing ink rub-off tester comprises a body in which a downwardly open chamber is formed, said body having bottom face portions surrounding the opening of said chamber, a rubbing element having means for mounting same in said chamber for free sliding movement perpendicularly to said bottom face portions and for combined circling and rotary motion about axes perpendicular to said bottom face portions, and means for imparting such combined circling and rotary motion to said rubbing element.

Figure 1:
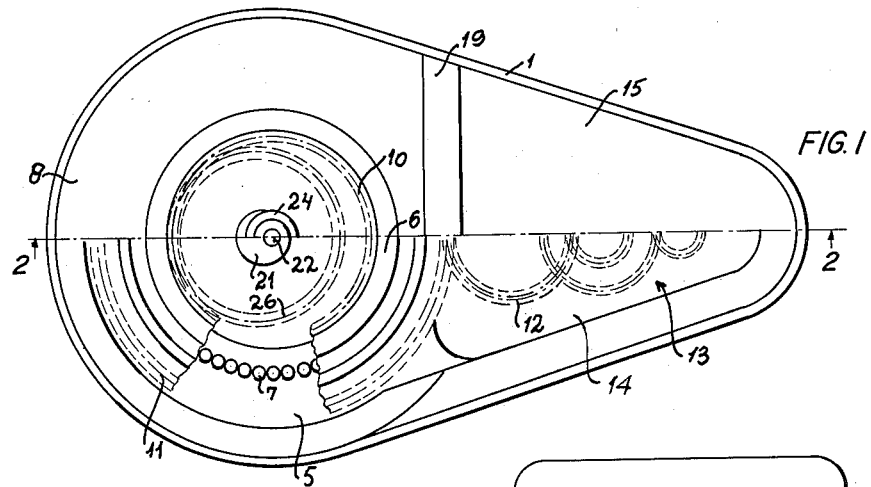
Figure 2:
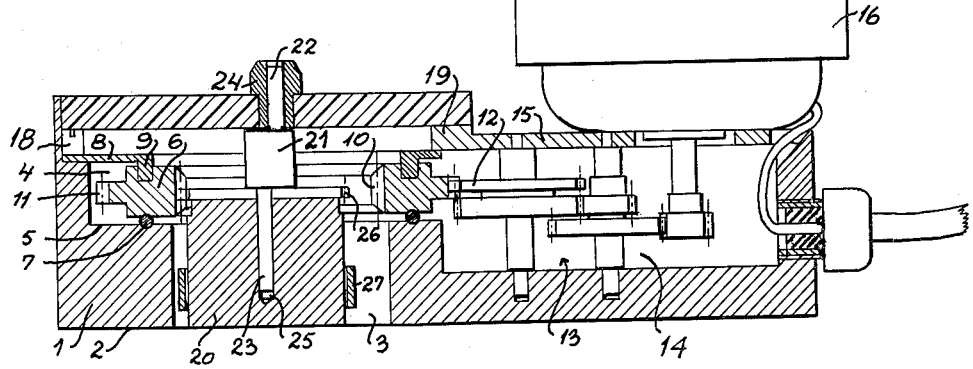
Figure 3:
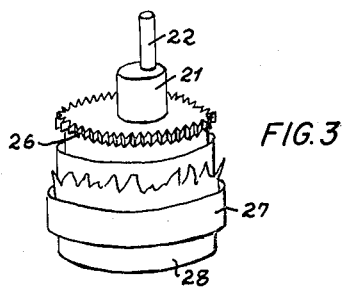

The invention will now be described in further detail with reference to the accompanying drawings in which FIG. 1 shows a top view, with parts broken away, of one form of a printing ink rub-off tester according to the invention, FIG. 2 a vertical section along the line 2—2 of FIG. 1, and FIG. 3 a perspective view of a rubbing element and crank member forming part of the device of FIGS. 1 and 2.

In the drawings, 1 is a body having a flat bottom face 2 and having a contour, in a horizontal plane, composed of a large circle at one end and a small circle at the other end, interconnected by their common tangents. Adjacent the wide end of the body, and in a position coaxial with the circle terminating the contour at that end, a cylindrical bore or chamber 3 is formed in the body 1, said chamber being open at its downward end. Above the chamber 3 there is provided a larger recess 4 forming a shelf 5 around the top of the cylindrical chamber 3. On this shelf a ring member 6 is rotatably supported on balls 7, the ring member being guided for rotary motion about the axis of the cylindrical chamber 3 by means of a guiding ring 8 attached to the marginal portion of the body 1 and having a downwardly extending flange engaging in a groove of the ring member 6.

The ring member 6 is constructed with inner teeth 10 projecting inwardly beyond the contour of the cylindrical chamber 3, and also with outer teeth 11 meshing with the last gear wheel 12 of a gear train, generally indicated at 13, mounted in an upwardly open cavity 14 formed at the narrow end of the body 1. The cavity 14 is closed at its top by means of a cover plate 15 carrying an electric motor 16 coupled to the gear train 13. A preferably transparent cover plate 17 located above the cylindrical chamber 3 and forming a top wall of the latter is supported on an attachment screw 18 of the guide ring 8 and on a transverse marginal ledge 19 of the cover plate 15 and is attached to the latter such as by means of screws, not shown.

20 is a generally cylindrical rubbing element having a smaller diameter than the chamber 3 and adapted to be mounted for combined circling and rotary motion in the latter by means of a crank member 21 having two pins 22 and 23 extending in opposite directions in mutually off-set positions. The cover plate 17 is provided with a bushing 24, co-axial with the cylindrical chamber 3, for receiving the pin 22, while the rubbing element 20 has a central bore 25 for receiving the pin 23. The rubbing element 20 is constructed at its top with circumferential teeth 26 meshing with the teeth 10 of the ring member 6 to form therewith an epicyclic gear.

A loose ring 27 slidable along the cylindrical surface of the rubbing element 20 serves to clamp a piece of cloth 28 across the bottom end of the rubbing element 20.

The operation of the described apparatus is as follows:

The apparatus is placed on a sheet to be tested which sheet may lie freely on a suitable supporting surface. If the rubbing element 20 and the crank member 21 are separate members, the rubbing element is first placed on the sheet, and the pin 23 of the crank member 21 is then introduced into the bore 25 of the rubbing element whereupon the body 1 is lowered on to the sheet in such a manner that the pin 22 of the crank member 21 is caught in the bushing 24. However, the crank member 21 and/or the rubbing element 20 may, if desired, be permanently connected with the body 1 and/or with each other, only it is essential that at least one of the pins 22 and 23, and preferably both, should be freely slidable in its associated bore within limits to permit the rubbing face of element 20 to play freely between positions slightly above and below the level of the bottom face 2 of the body 1.

After the apparatus has been placed on hte sheet the motor 16 is switched on and permitted to run for a predetermined period of time, say from 30–60 seconds and is then again switched off.

During the running period of the motor 16 the rubbing element will perform a combined circling and rotary motion while resting on the sheet with the full amount of its gravity since it is freely slidable in a vertical direction. Since the pressure exerted by the rubbing element on the sheet is thus constant, and the total movement performed by the rubbing element during a predetermined period of time is also constant, it is possible to obtain a very constant rubbing effect which besides, owing to the particular form of motion performed by the rubbing element, will be equally distributed in all directions and will be practically uniform over the whole of the area of the sheet confined by a circle slightly spaced from the wall of the cylindrical chamber 3. It will be understood, of course, that accurate standards should be set for the cloth 28 with which the rubbing face of element 20 is to be covered during use.

During the rubbing action of the element 20, the sheet area being rubbed is firmly held by the bottom face portions of the body surrounding the cylindrical chamber 3 so that there is no danger of tearing of the paper or of the formation of folds or plies.

It will be apparent from the above description that a rub-off tester has been provided according to the invention which is extremely simple in use, and it has been found that it is possible, by means of this apparatus, to obtain very accurate and reproducible measuring results.

We claim:

1. A printing ink rub-off tester comprising a body in which a downwardly open chamber is formed, said body having bottom face portions surrounding the opening of said chamber, a rubbing element having means for mounting same in said chamber for free sliding movement perpendicularly to said bottom face portions and for combined circling and rotary motion about axes perpendicular to said bottom face portions, an internally toothed ring surrounding said chamber, gear means on said rubbing element meshing with the teeth of said surrounding ring to form therewith an epicyclic gear, and driving means for said internally toothed ring.

2. A printing ink rub-off tester comprising a body in which a downwardly open chamber is formed, said chamber having a top wall, said body having bottom face portions surrounding the opening of said chamber, a rubbing element adapted to be received in said chamber, a crank member having off-set pins extending in opposite directions, one of said pins fitting rotatably in journalling means carried by said top wall of said chamber, the other pin fitting rotatably in journalling means of said rubbing element, at least one of said pins being freely slidable with respect to the journalling means co-operating therewith, an internally toothed ring surrounding said chamber, gear means on said rubbing element meshing with the teeth of said surrounding ring to form therewith an epicyclic gear, and driving means for said internally toothed ring.

3. A printing ink rub-off tester comprising a supporting structure adapted to be placed on a sheet of paper so as to hold same against a supporting surface, epicyclic gear means mounted in said supporting structure and including a planetary element which is freely displaceable in its axial direction and has an exposed downward end surface adapted to be supported on a sheet of paper held against a supporting surface by said supporting structure, and means for driving said epicyclic gear means.

4. A printing ink rub-off tester as in claim 3 having means for stretching a piece of cloth on said exposed end surface of said planetary element.

5. A printing ink rub-off tester as in claim 3 in which said planetary element has a cylindrical body portion, a ring slidable along said cylindrical portion being provided for stretching a cloth across said exposed end surface.

6. A printing ink rub-off tester comprising a body in which a downwardly open chamber is formed, said chamber having a top wall, said body having bottom face portions surrounding the opening of said chamber, a rubbing element adapted to be received in said chamber, a crank member having off-set pins extending in opposite directions, one of said pins fitting rotatably in journalling means carried by said top wall of said chamber, the other pin fitting rotatably in journalling means of said rubbing element, at least one of said pins being freely slidable with respect to the journalling means co-operating therewith, an internally and externally toothed ring surrounding said chamber, gear means on said rubbing element meshing with the inner teeth of said surrounding ring to form therewith an epicyclic gear, an electric motor mounted on said body, and a train of gears establishing a drive connection between said motor and the outer teeth of said ring.

References Cited in the file of this patent

UNITED STATES PATENTS

| | | |
|---|---|---|
| 2,734,375 | Galbraith et al. | Feb. 14, 1956 |
| 2,917,023 | Cohen | Dec. 15, 1959 |